United States Patent [19]
Kuenzner et al.

[11] Patent Number: 5,956,016
[45] Date of Patent: Sep. 21, 1999

[54] OPERATING DEVICE FOR MENU-CONTROLLED FUNCTIONS OF A VEHICLE

[75] Inventors: Hermann Kuenzner, Freising; Harald Wiedemann, Hohenpeissenberg, both of Germany

[73] Assignee: Bayerische Motoren Werke Aktiengesellschaft, Munich, Germany

[21] Appl. No.: 08/820,904

[22] Filed: Mar. 19, 1997

[30] Foreign Application Priority Data

Mar. 19, 1996 [DE] Germany ............... 196 10 700
Nov. 8, 1996 [DE] Germany ............... 196 46 226

[51] Int. Cl.⁶ ..................................... G09G 5/00
[52] U.S. Cl. .................. 345/156; 345/145; 345/161; 345/157
[58] Field of Search ................... 345/161, 156, 345/157, 145, 164, 121, 158; 178/18, 19, 20

[56] References Cited

U.S. PATENT DOCUMENTS

| | | | |
|---|---|---|---|
| 4,670,743 | 6/1987 | Zemke | 345/157 |
| 4,868,549 | 9/1989 | Affinito et al. | 345/164 |
| 4,910,503 | 3/1990 | Brodsky | 345/161 |
| 5,270,689 | 12/1993 | Hermann | 345/157 |
| 5,721,566 | 2/1998 | Rosenberg et al. | 345/161 |

FOREIGN PATENT DOCUMENTS

| | | |
|---|---|---|
| 0 366 132 | 5/1990 | European Pat. Off. . |
| 0 489 469 | 6/1992 | European Pat. Off. . |
| 0 701 926 | 3/1996 | European Pat. Off. . |
| 33 46 370 | 7/1985 | Germany . |
| 35 14 438 | 9/1986 | Germany . |
| 38 30 933 | 10/1989 | Germany . |
| 38 36 555 | 6/1990 | Germany . |
| 40 17 897 | 11/1991 | Germany . |
| 40 34 166 | 4/1992 | Germany . |

*Primary Examiner*—Richard A. Hjerpe
*Assistant Examiner*—Francis Nguyen
*Attorney, Agent, or Firm*—Evenson, McKeown, Edwards & Lenahan, PLLC

[57] ABSTRACT

In an operating device for menu-controlled functions of a motor vehicle that can be shown symbolically on a screen and selected by an actuator, the actuator is movable between mechanical stops into a position that corresponds to the position of the symbol of the selectable function on the surface of the screen and which provides haptic feedback to the actuator when the selectable function is changed by moving the actuator.

32 Claims, 8 Drawing Sheets

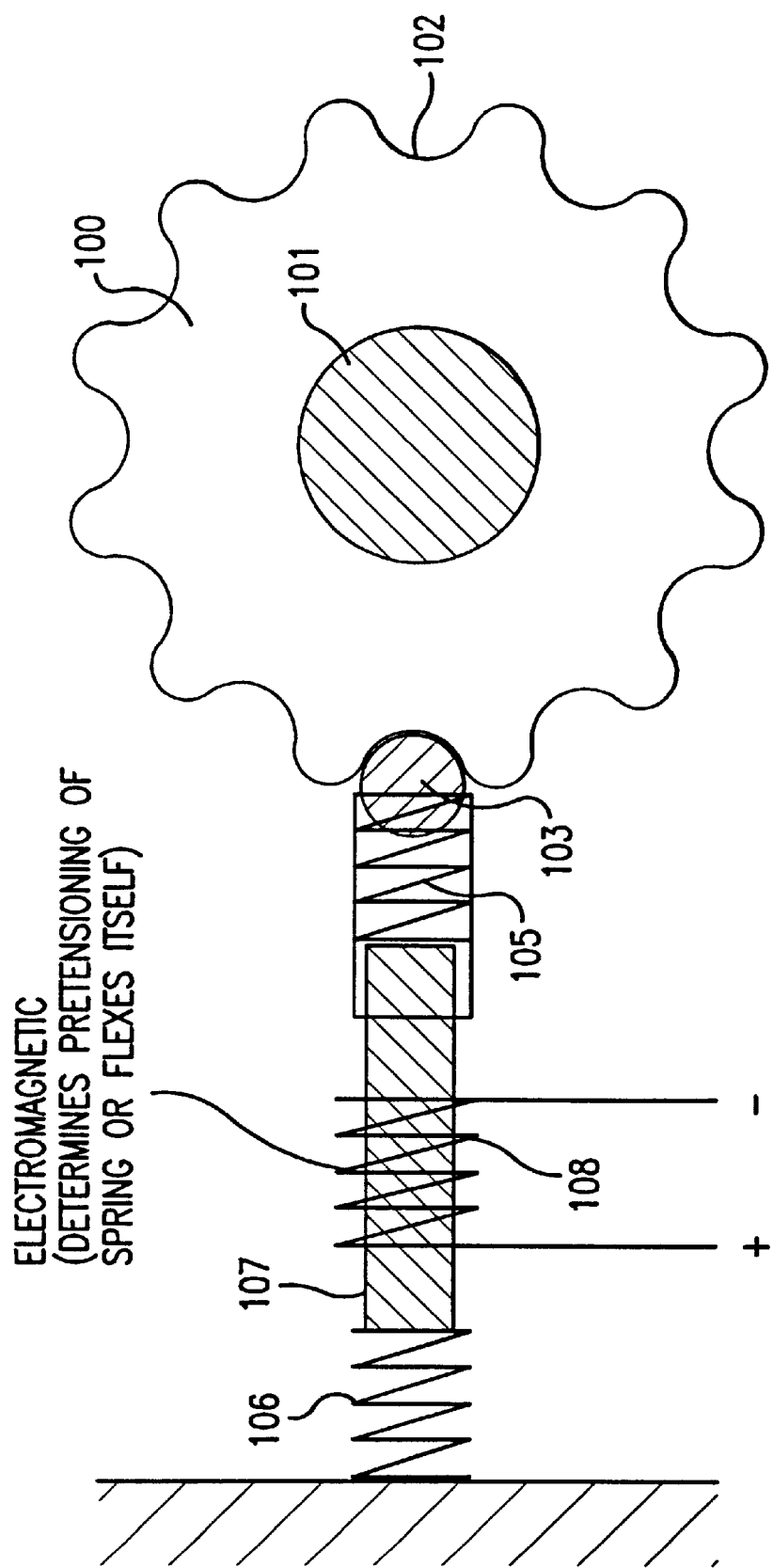

5,956,016

OPERATING DEVICE FOR MENU-CONTROLLED FUNCTIONS OF A VEHICLE

BACKGROUND AND SUMMARY OF THE INVENTION

This application claims the priority of German Application Nos. 196 10 700.8 and 196 46 226.6, the disclosures of which are expressly incorporated by reference herein.

The invention relates to an operating device and, more particularly, to an operating device for menu-controlled functions of a vehicle which can be displayed symbolically on a screen and selected by an actuator.

An operating device of this kind is known from German Patent document DE 35 14 438 C. The actuator is a plurality of keyswitches arranged around the screen. These switches are used to select the function or the menu displayed on the screen in the immediate vicinity of the respective actuating switch. The known operating device requires a considerable amount of space since it requires room for the actuating key in the immediate vicinity of the screen as well as the screen area itself. Such space is frequently not available.

In addition, there is the problem of locating the screen and the actuating keys from the ergonomic standpoint. Locating the screen and the actuating keys adjacent to one another is ergonomically unsatisfactory since considerable time and attention are required for selecting and actuating the desired actuating key. This time is frequently unavailable when such devices are used in vehicles.

It is also known in connection with personal computers to select menu-controlled functions with the aid of a mouse, trackball, touch screen, joystick, etc. When the device is used in a vehicle, the problem arises of a lack of mechanical feedback for the position of the selected function as well as the danger of "running away," i.e. overshooting the limits of the screen when using a cursor, frame, or optical field that is moved over the surface of the screen with the aid of the actuator, as well as the risk of unintentional changes in the selected function caused by mechanical vibrations produced by corresponding movements of the actuator.

There is therefore needed an operating device of the abovementioned type that is optimally suited for use in vehicles and which permits the spatial separation of the actuator from the surface of the screen. The latter offers the advantage of an optimum arrangement of the screen and the actuator. The screen can be located in the visual field of the vehicle user and the actuator can be located within reach of the user.

These needs are met according to the present invention by an operating device for menu-controlled functions of a vehicle which can be displayed symbolically on a screen and selected by an actuator. The actuator is movable between mechanical stops into a position that corresponds to the position of the symbol of the selectable function on a screen surface. Haptic feedback is provided by the actuator when the selectable function is changed by moving the actuator.

The mechanical movement of the actuator is displayed on the surface of the screen. At the same time, haptic feedback makes any changes in the selected function recognizable even without turning to look at the screen or the actuator. It is therefore possible to change the selected function "blind." Going off the surface of the screen is also prevented by the mechanical stop. The danger of an undesired change in the selected function caused by external influences is prevented by the mechanical resistance to the movement of the actuator that is linked to haptic feedback. Even when clicking-on and choosing the desired function are performed with a clear time interval between them, there is no risk of the selected function being changed inadvertently in the meantime by an undesired change in the position of the actuator.

Other objects, advantages and novel features of the present invention will become apparent from the following detailed description of the invention when considered in conjunction with the accompanying drawings.

BRIEF DESCRIPTION OF THE DRAWINGS

FIG. 9 is a schematic representation of another embodiment according to the present invention.

DETAILED DESCRIPTION OF THE DRAWINGS

Figure 1:
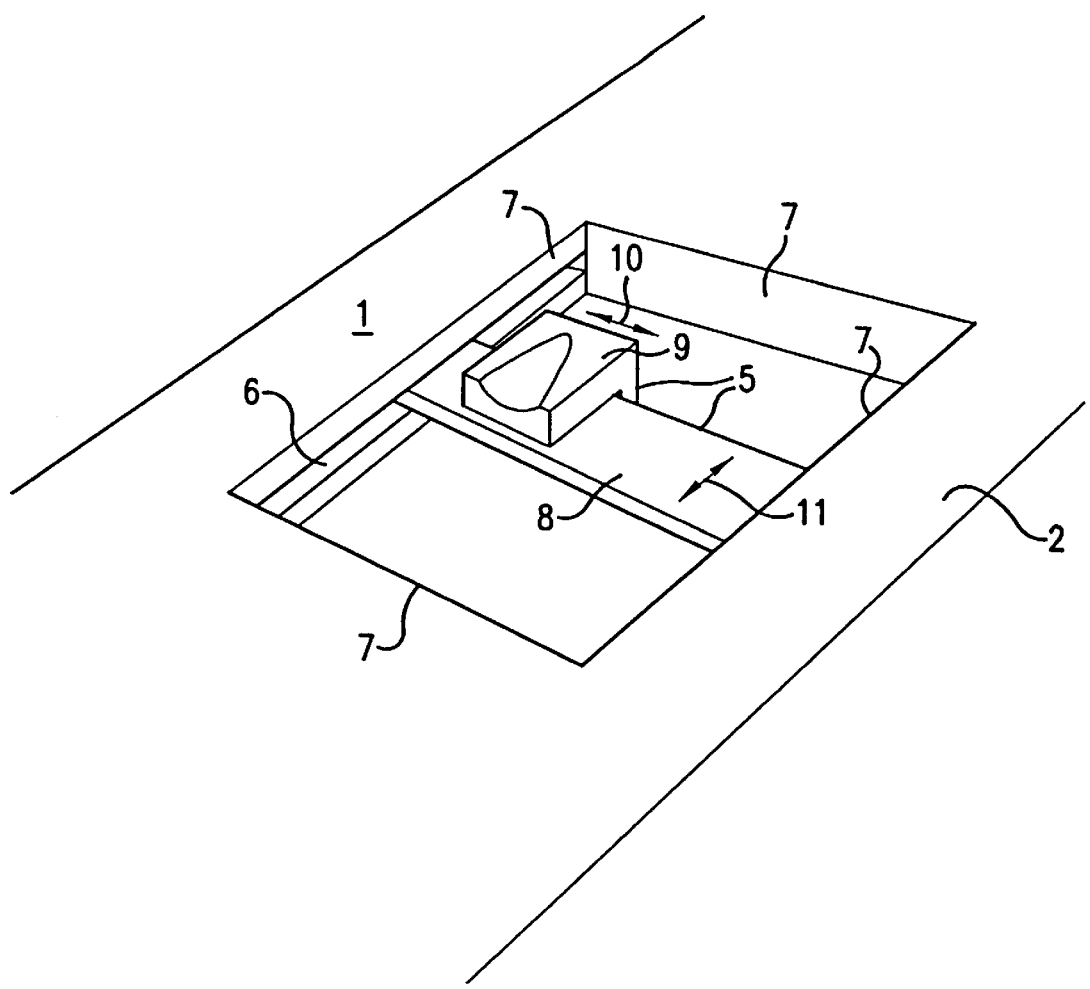
FIG. 1 is a perspective view illustrating a first embodiment of the present invention.

The operating device 1 shown in FIG. 1 is built into the center console 2 of a vehicle (not shown). It serves to make choices from a menu or partial menu or to choose a function of the vehicle that is contained in a partial menu. For this purpose, the menu, partial menu, or function to be selected is displayed on a screen 3 (see FIG. 7) in the visual field of the vehicle operator. With the aid of operating device 1, a cursor 4 (see cursor arrow in FIG. 7) is positioned on the surface of screen 3. An actuator 5 serves the purpose of positioning the cursor 4 on the screen. The actuator 5 is movable in a frame 7 and runs in a guide 6.

As shown in FIG. 1, actuator 5 consists of a carriage 8 whose two ends run in guide 6 (because of the perspective view, only one end of carriage 8 can be seen), and of a pusher 9 that can be displaced transversely with respect to carriage 8. The directions of movement of pusher 9 indicated by a double arrow 10 will be referred to in the following as "horizontal" while the directions of motion of carriage 8 symbolized by a double arrow 11 will be termed "vertical" in the following.

Figure 2:
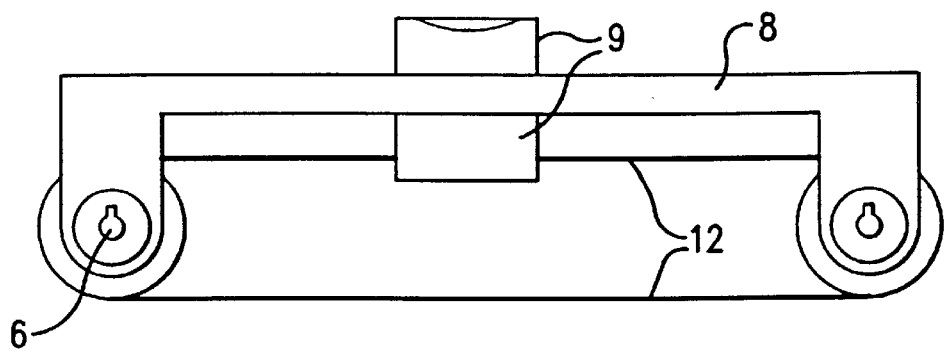
FIG. 2 is a side view illustrating details of FIG. 1.
Figure 3:
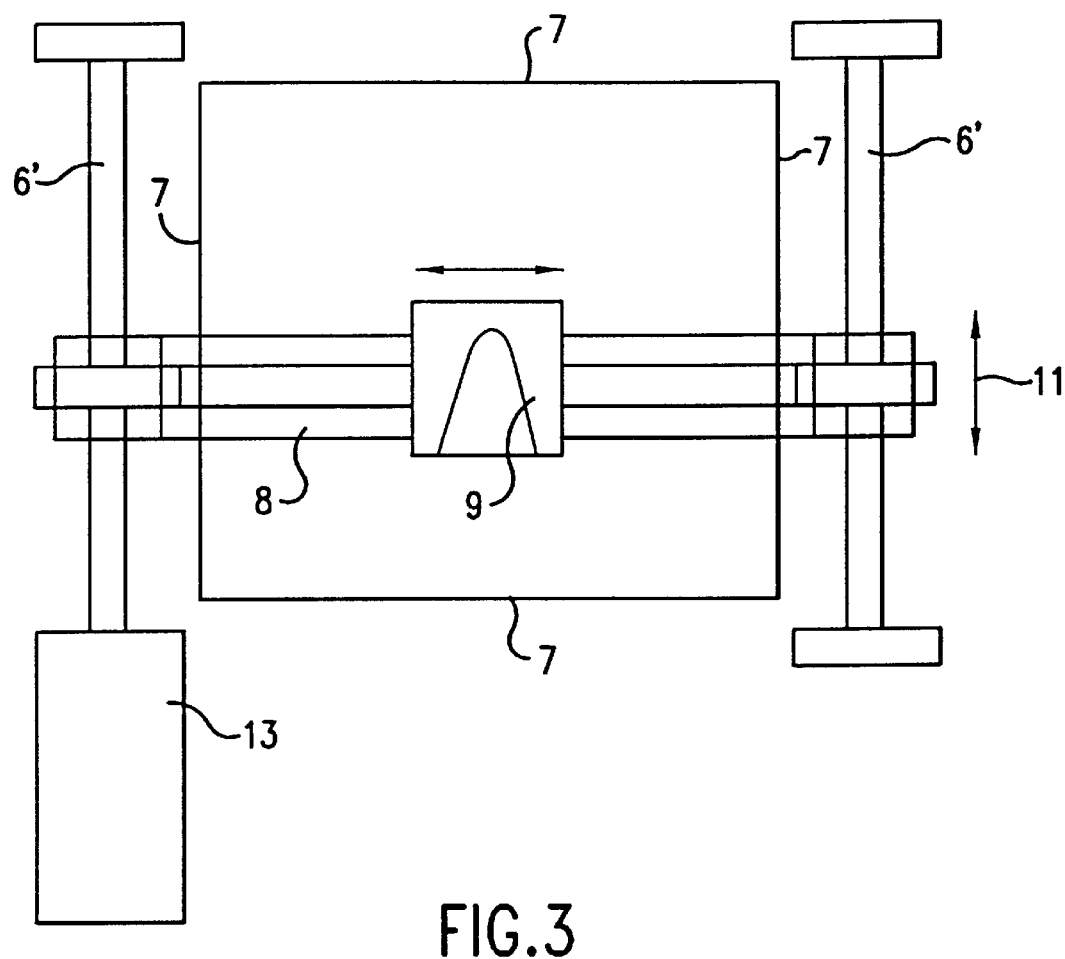
FIG. 3 is a top view illustrating details of FIG. 1.

The internal structure of the operating device in FIG. 1 is shown in FIGS. 2 and 3. The movement of pusher 9 on carriage 8 is detected by a continuous toothed belt 12 and converted by rotatable shaft 6' of guide 6 into a rotary movement. This rotary movement is detected by an electric motor 13 and converted into positioning commands for cursor 4. With the aid of electric motor 13, it is also possible to reinforce the movement of pusher 9 or to provide haptic feedback to the user. For this purpose, electric motor 13 can be controlled by position detection, not shown, so that the motor, in a central motion area of pusher 9, in other words far from the stop provided by frame 7, applies a torque to toothed belt 12 and hence to pusher 9 that is directed opposite to the frictional torque produced by friction of the elements moved by the pusher 9 such as guides 6' and toothed belt 12. When pusher 9 moves toward frame 7, instead of a reinforcing torque, a torque can be applied that reinforces the action of these frictional torques by its own action. The operator then receives additional tactile feedback indicating the position of pusher 9 within the entire movement range defined by the two stops on frame 7.

During the vertical movement of carriage 8, feedback to the operator is provided haptically when specified positions have been reached. These haptic feedbacks can be produced for example by a force/travel behavior similar to that achieved in the above described method with an electric motor by using permanent magnets in the moving and static parts for example (but with fixed tactile feedbacks) or by using an electric motor for vertical movement.

In this way, the operator continuously receives feedback indicating where pusher 9 is located. This feedback is achieved without turning to look at the operating device. The vehicle operator is required only to concentrate on the screen and can see there which of the functions, partial menus, and menus displayed has been set by an appropriate positioning of slide 9 within the entire operating field limited by frame 7.

Figure 4:
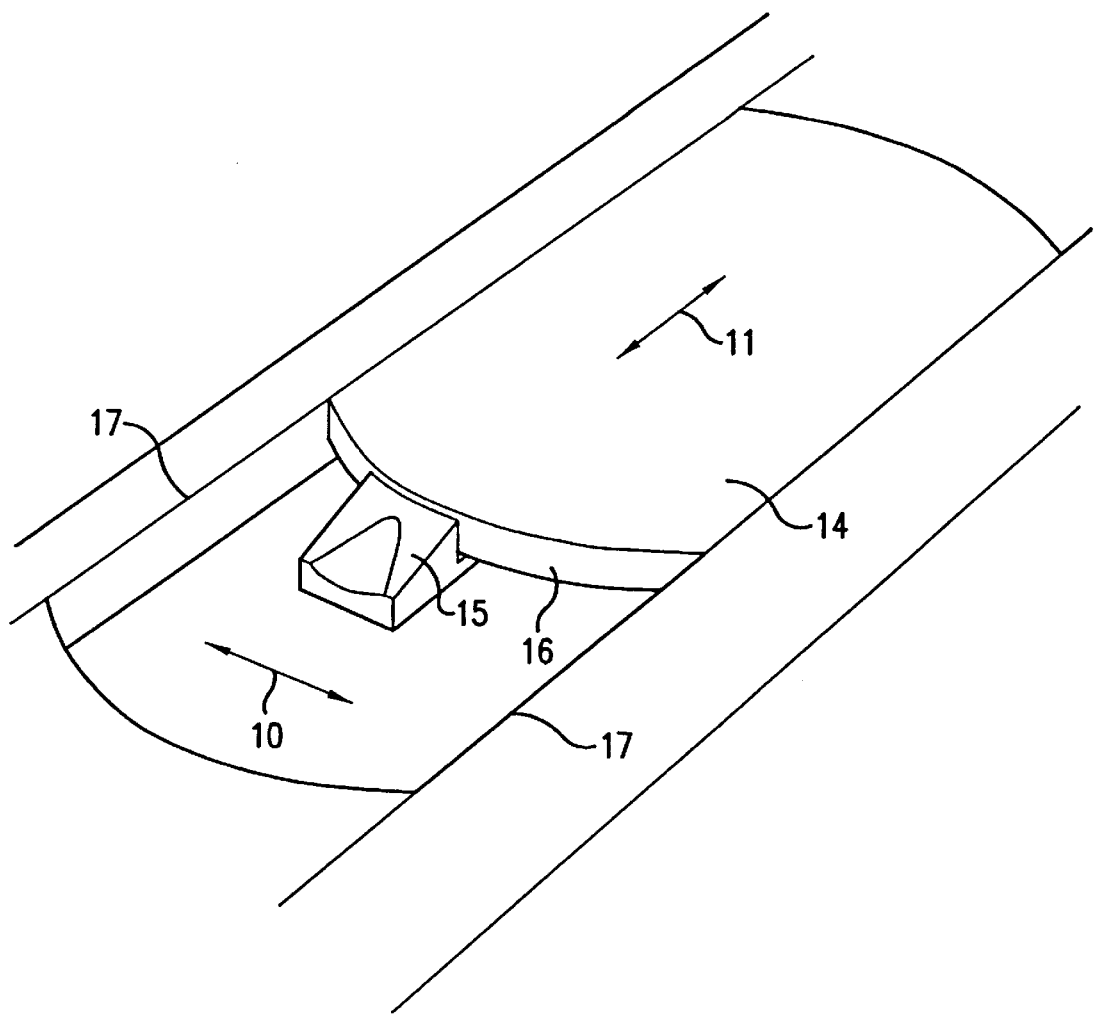
FIG. 4 is a perspective view of a second embodiment according to the present invention.

In the embodiment in FIG. 4, instead of an actuator that is displaceable directly in two directions, a structure is chosen that consists of a body 14 displaceable in the vertical direction and an actuator 15 pivotable with respect thereto. Actuator 15 is fastened to body 14 and is movable around its rounded front side 16. By moving body 14 within a frame 17 that corresponds to frame 7 in which the vertical movement corresponding to the previously described embodiment applies, as well as the superimposed pivoting movement corresponding to the horizontal movement of actuator 15, it is once again possible by appropriate positioning of actuator 15 within the operating field (limited by frame 17) to select an assigned function, etc. on screen 3. Here again it is possible to superimpose haptic feedback on the movement of body 14 and actuator 15 and thus give the operator an impression, without his turning to look, of the position in which actuator 15 is located and therefore which of the elements shown on screen 3 has been selected. In addition, it is possible as described above to make the transition from one screen element to the next, perceptible.

Figure 5:
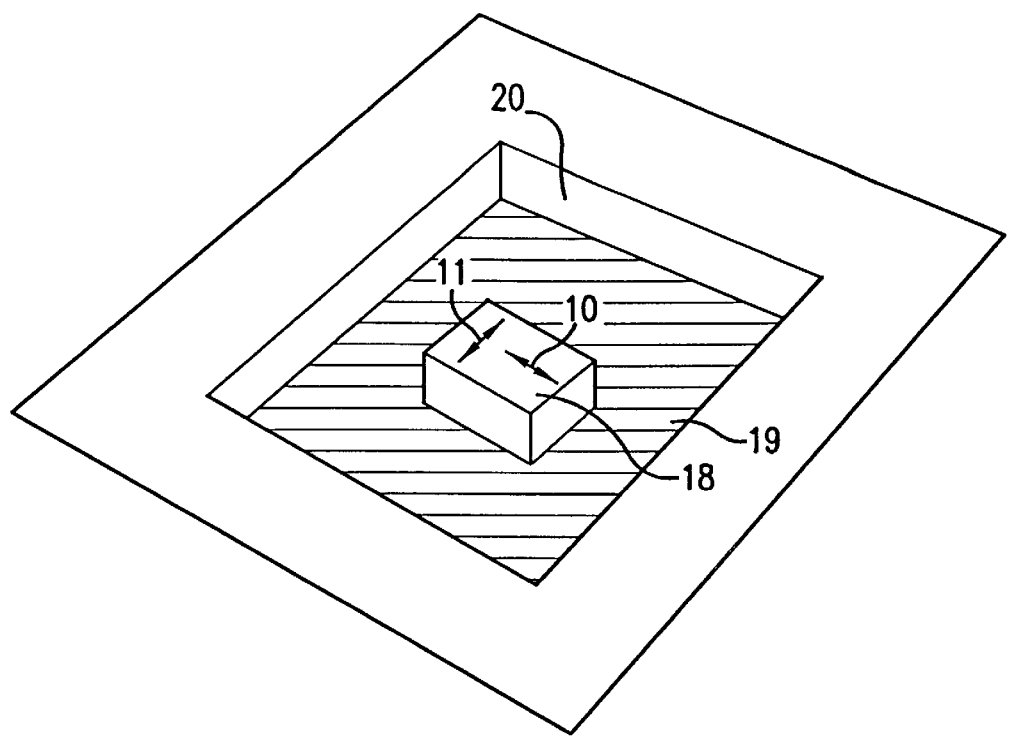
FIG. 5 is a perspective view of a third embodiment according to the present invention.

In the embodiment in FIG. 5, an actuator 18 is mounted on a plate 19 that is movable in the horizontal and vertical directions. The corresponding arrows 10 and 11 show the possible directions of movement of plate 19. The movement of plate 19 is limited by a stop formed by a frame 20 which actuator 18 abuts at the limits of its movement range. By means of a suitable transmission or the like it is also possible to detect a change in the position of actuator 18 and therefore of plate 19 and thus to obtain one of the screen elements selected on screen 3.

Figure 6:
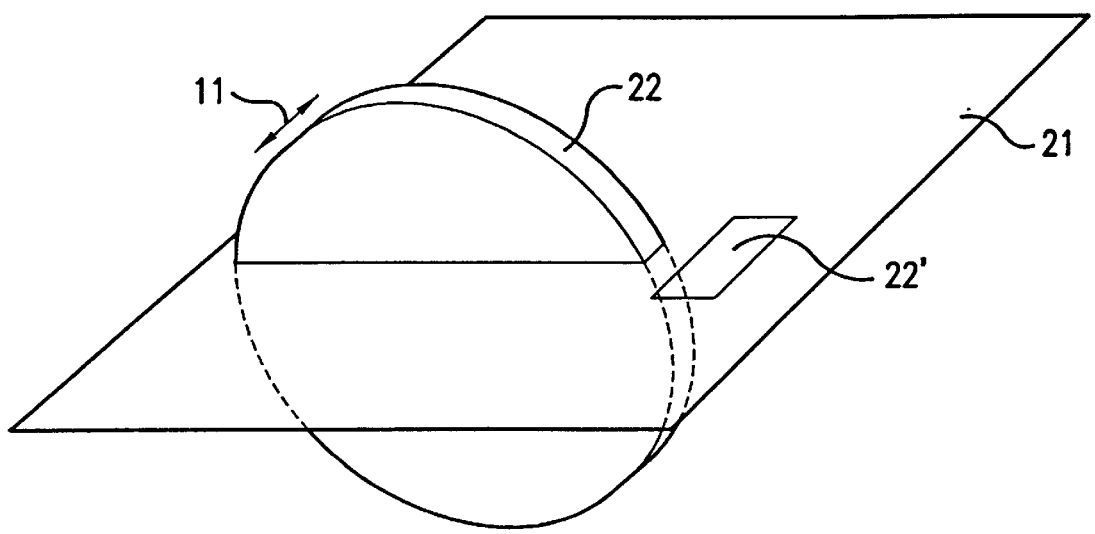
FIG. 6 is a perspective view of a fourth embodiment according to the present invention.

In the embodiment according to FIG. 6, a plate 21 corresponding to plate 19 is provided once again which is displaceable exclusively in the vertical direction (arrow 11). A knob 22 is rotatably mounted on plate 21. The knob projects from the surface of plate 21 and is rotatable. The rotary motion of knob 22 can be limited by a mechanical stop but it can also take the form of endless rotary motion. The rotary motion itself can generate haptic feedback by means of latching positions. Similarly, the vertical movement of plate 21 can deliver tactile feedback to the operator when specific positions have been reached or exceeded.

The relationship between the position of the individual actuator (9, 15, 18, or 22) within the operating device in FIGS. 1 to 6 and the function selected on screen 3, the partial menu, or the menu (hereinafter referred to as the image element) is described with reference to FIG. 7. With the aid of the actuator, 9 for example in FIGS. 1 to 3, a cursor 4 is controlled that moves over the surface of screen 3 and whose position corresponds to the position of actuator 9 within operating field 7'. Operating field 7' is limited by frame 7 in the embodiment in FIGS. 1 to 3. Surface 3' of screen 3 is divided into a number of fields whose limits are symbolized by dashed lines. In a left column for example, there are four fields associated with a total of four menus, namely for navigation, radio, air conditioning, and on-board computer (BC).

The operating surface 7' of the operating device is limited by frame 7 as shown in FIG. 1. It is located within reach of the user. Actuator 9 is movable within operating area 7'. By shifting actuator 9, a menu or a function on the menu can be selected that is associated with a position on screen 3 with which the respective position of actuator 9 is associated. To make this clearer, operating surface 7' has been divided into a corresponding number of fields. The fields are likewise delimited by dashed lines to show them clearly.

When actuator 9 is at the point shown on the upper left edge of operating surface 7', cursor 4 in the corresponding position can be detected in the position shown and thus the "navigation system" menu associated with the image element is selected. If actuator 9 is shifted vertically (downward in the figure), it enters the adjacent field. The synchronously moving cursor then assumes a position in which the next menu, "radio adjustment," is selected in this case. In this manner, by a vertical movement of actuator 9 in the manner shown, in other words by moving along left frame 7, the desired menu can be chosen.

To select the desired menu, a trigger switch 22' is also provided that is on the edge of operating field 7' or, as in the embodiment of FIG. 6, next to actuating member 22. The trigger switch 22' chooses the selected menu when actuated. It is also possible to integrate the triggering switch with the actuator and, as described for example in German Patent document DE 38 36 555 A, to trigger the respective switch function by moving the switch vertically with respect to the plane of motion of the actuator.

The representation of the menu functions in the associated fields of surface 3 is linked to the selection of the respective menu. In this case, a total of nine fields is shown, divided by the dashed lines, in which these functions are indicated. The choice of the desired function can be made in corresponding fashion by a suitable adjustment of actuator 9 in the field of operating area 7' that spatially corresponds to the field on surface 3'. The choice of the function can be made with the aid of the trigger switch as described in the case of the menu.

Adjustment of the actuator and hence selection of the desired image element and therefore of the function or associated menu linked through the image element on screen surface 3' is reinforced by haptic feedback that can be felt by the operator at actuator 9. Firstly, the movement of actuator 9 is limited by frame 7. The operator then immediately receives information as to where actuator 9 is located within operating field 7'. In addition, as described with reference to FIGS. 2 and 3, the motion of the actuator in the horizontal direction is reinforced with the aid of electric motor 13. Finally, if a field limit indicated by a dashed line is exceeded, the operator is signaled by corresponding haptic feedback that he has left the field initially set and is now located in the adjoining field, either vertically or horizontally, and he has for example selected the next menu or next function.

Figure 7:
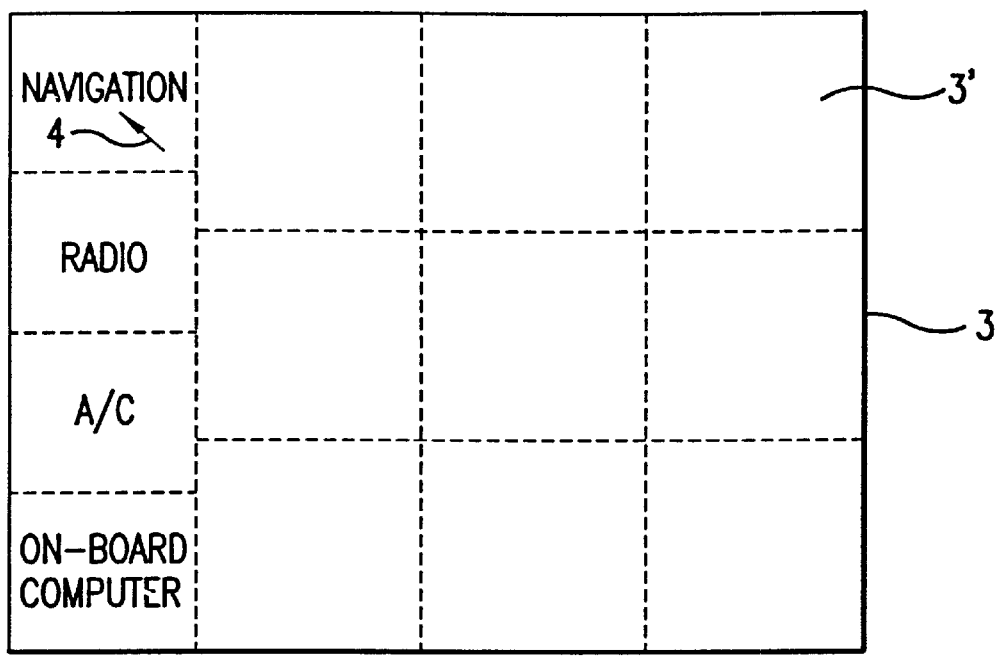
FIG. 7 illustrates an example of a function display illustrating the operation of the present invention.
Figure 7:
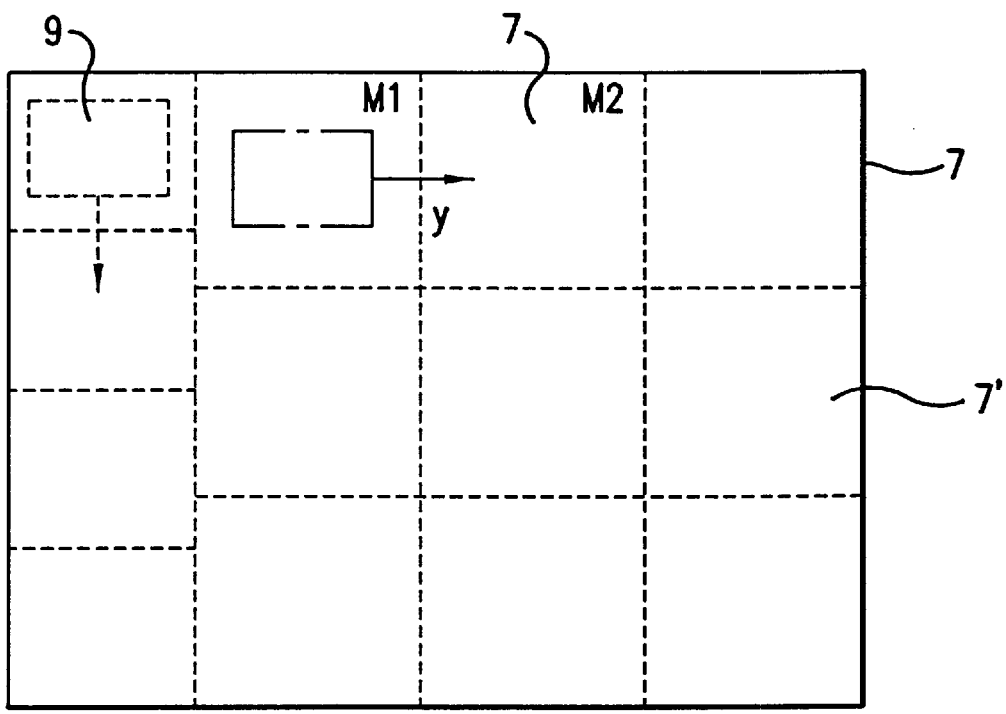
Figure 7A:
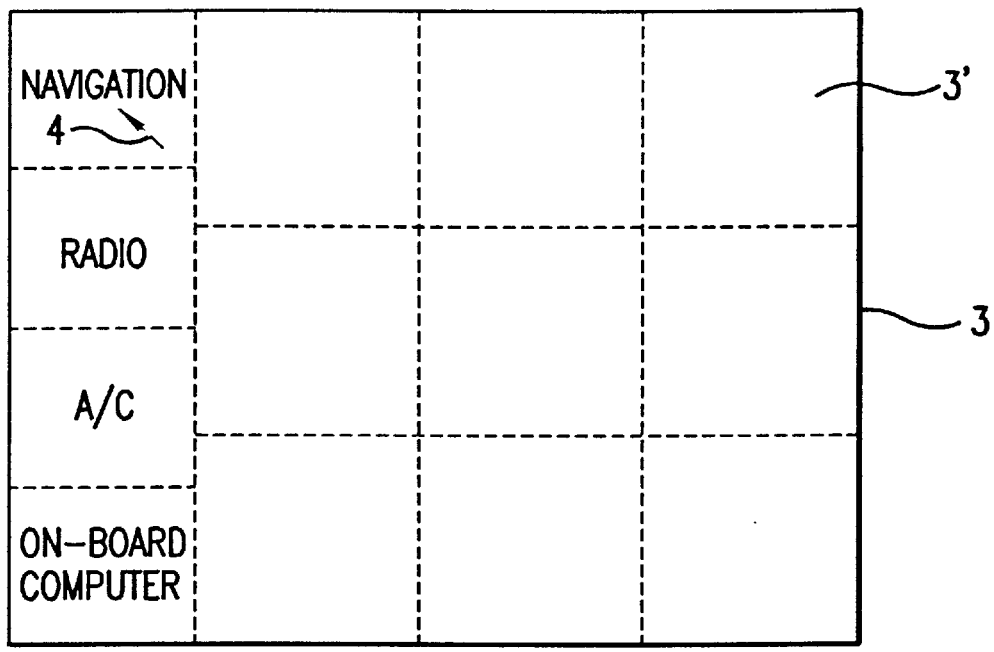
Figure 7B:
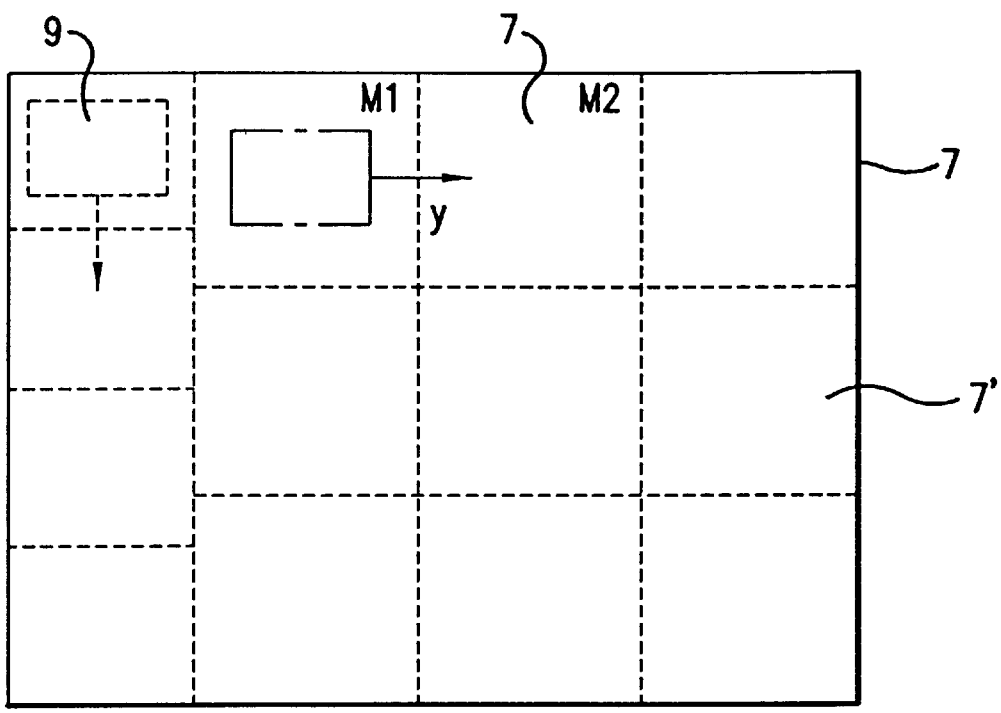
Figure 8:
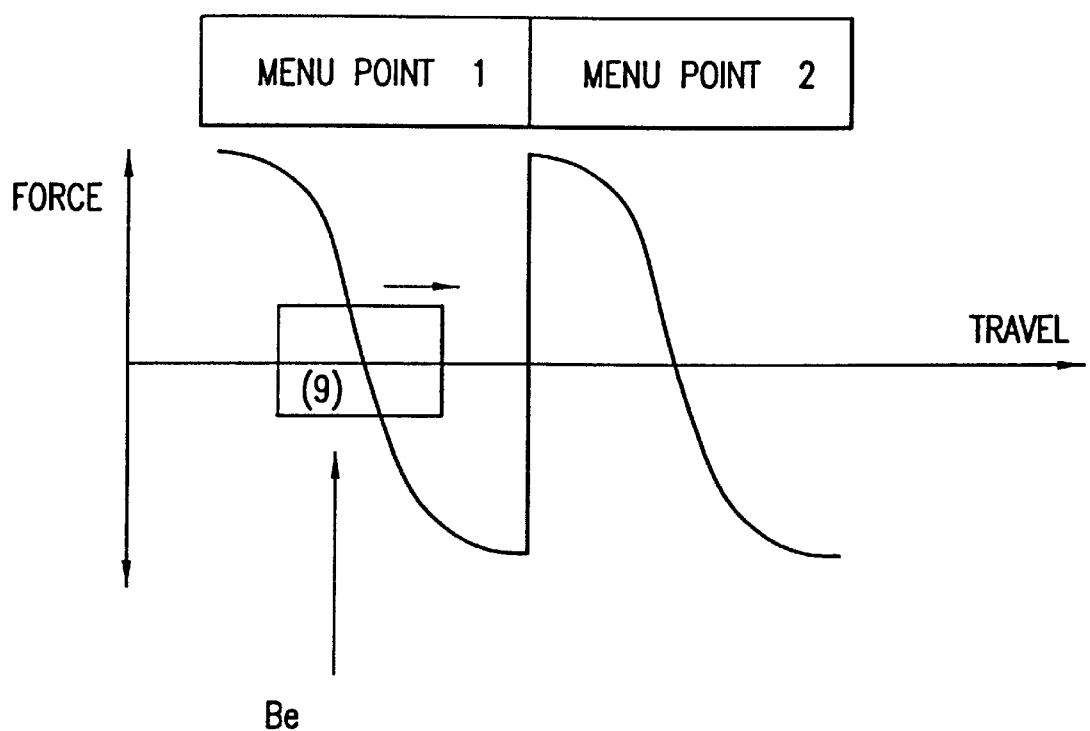
FIG. 8 is a graph of the force exerted on the actuator during its transition from one menu field to another.

For this purpose, the movement of actuator 9, starting from the position drawn with dot-dashed lines in FIG. 7, is seen in a field M1 (corresponding to menu point 1) to be moved into adjacent field M2 (corresponding to menu point 2). The starting position of actuator 9 is determined by a position sensor, not shown. By means of the electric motor, a force is exerted during the transition from M1 to M2 that is indicated in the graph in FIG. 8. In the starting position in the middle of field M1, no force acts on the actuator. As it nears an imaginary boundary between fields M1 and M2, indicated by a dashed line, a steadily increasing force will be exerted with increasing proximity by a corresponding control of the electric motor that is opposite to the motion. This is indicated by the negative sign on the force in FIG. 8. When the boundary between fields M1 and M2 is exceeded, a change in the direction of the force takes place which in the ideal case occurs abruptly as indicated by the perpendicular force curve at boundary g. If actuator 9 exceeds the limits of the field, the direction of the force is reversed and initially a relatively high force that decreases inversely with the distance from the field boundary is exerted on actuator 9 in the direction of motion. This is indicated by the positive sign and the value of the force that decreases toward the middle of field M2. If the actuator is in the middle of field M2, once again no force acts on the actuator. The force then has a value of 0.

In this manner, it is possible without looking at the operating field to control cursor 4 within surface 3' and thus click on the desired function or the desired menu and to perform selections with the aid of the trigger switch. Operating field 7 can be located within reach while surface 3' of screen 3 can be located in the visual field of the vehicle operator. Haptic feedback reduces the time necessary to turn and look and thus increases driving safety.

FIG. 9 shows one embodiment of the invention in which the tactile feedback increases toward the stops and the actuator is rotatable around an axis. With special design measures, user-friendliness can be improved by using a simple design.

Actuator 100 has a rotational axis 101. Actuator 100 is fluted at its edge 102, in other words it is provided with a series of notches and elevations. The number of notches can be equal to the number of menu points for example.

Actuator 100 cooperates with an opposite part 103 which is a spring-loaded ball. The ball is mounted on springs and abuts a stop 102. Springs 105 and 106 are provided to secure ball 103. There is also an electromagnet that consists of a bar magnet 107 and a coil 108 between springs 105 and 106.

The position of ball 103 can be adjusted with the aid of electromagnet 107/108. In the position shown, ball 103 has engaged a depression in the actuator. However, actuator 100 can rotate. Ball 103 is pushed back against the action of springs 105 and 106 by the elevations that adjoin the depressions, in order then to snap into the next depression under the action of springs 105 and 106.

In terms of forces, the movement of the actuator takes place initially with a constantly increasing opposite force until ball 103 has been pushed back all the way by the elevation or by a subsequent constant reduction of actuating force that can include a reinforcement of the rotary motion of the actuator under the influence of springs 105 and 106.

It is possible with the aid of electromagnets 107/108 to place ball 103 in a variable position with respect to actuator 100. Thus, ball 103 can be pulled back completely out of the engagement range of edge 102. Ball 103 then no longer cooperates with actuator 100. The latter is completely free to rotate. As a result, for example, it is possible to have a rapid change in menu points or simultaneous tactile feedback from the individual measurement points corresponding to the set latching positions of actuator 100.

Accordingly, ball 103 can also be pushed with great force into the depression in edge 102 under the influence of electromagnet 107/108. Springs 105 for example can even be blocked. Then the rotary movement of actuator 100 is blocked. This can serve for example to simulate a mechanical stop for actuator 100.

It is also possible to vary the force acting on ball 103 by applying a variable amount of current to coil 108 during the rotary movement of the actuator in order thereby for example to keep the mechanical resistance exerted by ball 103 constant during a portion of the rotary movement. For this purpose, ball 103 is moved through electromagnets 107/108 corresponding to the path of motion determined by edge 102. Thus the operator cannot feel the shape of edge 102 during this part of the rotary motion.

In the event of a power failure, electromagnet 107/108 will not operate. Springs 105 and 106 serve to provide tactile feedback, thus ensuring emergency operation of the operating device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An operating device for menu-controlled functions of a vehicle which are symbolically displayed on a screen, comprising:

an actuator which selects said menu-controlled functions, said actuator being movable at least linearly over an operating surface which spatially corresponds to a surface of the screen into a position corresponding to a symbol position of a selected menu-controlled function on the screen surface wherein each of said menu-controlled functions on the screen corresponds to a unique position within the operating surface;

mechanical stops arranged as part of the operating device to limit said movement of the actuator over the operating surface; and wherein the actuator provides haptic feedback when the selected menu-controlled function is changed via movement of the actuator.

2. The operating device according to claim 1, wherein an intensity of the haptic feedback increases as said actuator moves toward the mechanical stops.

3. The operating device according to claim 1, wherein said actuator is movable in a vertical direction in a plane of the operating surface.

4. The operating device according to claim 2, wherein said actuator is movable in a vertical direction in a plane of the operating surface.

5. The operating device according to claim 1, wherein said actuator is movable in a horizontal direction in a plane of the operating surface.

6. The operating device according to claim 2, wherein said actuator is movable in a horizontal direction in a plane of the operating surface.

7. The operating device according to claim 3, wherein said actuator is movable in a horizontal direction in a plane of the operating surface.

8. The operating device according to claim 5, further comprising a mechanical transmission coupled to said actuator; and an electrical scanning device coupled to said mechanical transmission.

9. The operating device according to claim 1, wherein said actuator is rotatable about an axis.

10. The operating device according to claim 2, wherein said actuator is rotatable about an axis.

11. The operating device according to claim 3, wherein said actuator is rotatable about an axis.

12. The operating device according to claim 1, wherein said actuator is pivotable in a horizontal direction in a plane of the operating surface.

13. The operating device according to claim 2, wherein said actuator is pivotable in a horizontal direction in a plane of the operating surface.

14. The operating device according to claim 3, wherein said actuator is pivotable in a horizontal direction in a plane of the operating surface.

15. The operating device according to claim 1, further comprising a frame in which said actuator is movable between the mechanical stops.

16. The operating device according to claim 1, further comprising a trigger switch associated with said actuator, said trigger switch triggering the selected menu-controlled function.

17. The operating device according to claim 16, wherein said trigger switch is movable via said actuator.

18. The operating device according to claim 16, wherein said trigger switch is integrated with the actuator.

19. The operating device according to claim 17, wherein said trigger switch is integrated with the actuator.

20. The operating device according to claim 2, wherein said actuator is rotatable around an axis and has a fluted edge; and further comprising a matching part cooperating with said fluted edge of said actuator and being displaceable perpendicularly relative to the axis of rotation of the actuator.

21. The operating device according to claim 20, wherein said matching part is rotatably mounted.

22. The operating device according to claim 20, wherein said matching part is spring-mounted.

23. The operating device according to claim 21, wherein said matching part is spring-mounted.

24. The operating device according to claim 20, wherein a position of said matching part is adjustable relative to said actuator.

25. The operating device according to claim 24, wherein said matching part is adjustable in an end position in which rotary motion of said actuator is blocked.

26. The operating device according to claim 20, further comprising an electromagnet arranged to move said matching part.

27. The operating device according to claim 9, wherein said axis extends in parallel to a plane of the operating surface.

28. The operating device according to claim 10, wherein said axis extends in parallel to a plane of the operating surface.

29. The operating device according to claim 11, wherein said axis extends in parallel to a plane of the operating surface.

30. The operating device according to claim 20, wherein said axis extends in parallel to a plane of the operating surface.

31. An operating device for menu-controlled functions of a vehicle which are symbolically displayed on a screen, comprising:

an actuator which selects said menu-controlled functions, said actuator being movable at least linearly over an operating surface which spatially corresponds to a surface of the screen into a position corresponding to a symbol position of a selected menu-controlled function on the screen surface;

mechanical stops arranged as part of the operating device to limit said movement of the actuator over the operating surface;

wherein the actuator provides haptic feedback when the selected menu-controlled function is changed via movement of the actuator; and wherein the haptic feedback provides an increasing force opposite a direction of movement when the actuator is moved from one position corresponding to one function field symbolically displayed on the screen toward an imaginary boundary of another position corresponding to an adjoining function field symbolically displayed on the screen.

32. The operating device according to claim 31, wherein when the actuator crosses the imaginary boundary, the haptic feedback provides a force assisting the direction of movement in order to move the actuator away from the imaginary boundary into the adjoining function field.

* * * * *